US007042937B2

United States Patent
Birru

(12) United States Patent
(10) Patent No.: US 7,042,937 B2
(45) Date of Patent: May 9, 2006

(54) HYBRID FREQUENCY-TIME DOMAIN EQUALIZER

(75) Inventor: Dagnachew Birru, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 801 days.

(21) Appl. No.: 09/840,203

(22) Filed: Apr. 23, 2001

(65) Prior Publication Data

US 2003/0007554 A1 Jan. 9, 2003

(51) Int. Cl.
H03H 7/30 (2006.01)
H03H 7/40 (2006.01)
H03K 5/159 (2006.01)

(52) U.S. Cl. .................... 375/233; 375/229; 375/230; 375/232; 333/18

(58) Field of Classification Search ............... 375/233, 375/343, 260, 229, 230, 232; 333/18
See application file for complete search history.

(56) References Cited

U.S. PATENT DOCUMENTS

| | | | |
|---|---|---|---|
| 6,216,148 B1* | 4/2001 | Moran et al. ............... 708/819 |
| 6,359,938 B1* | 3/2002 | Keevill et al. .............. 375/316 |
| 6,456,673 B1* | 9/2002 | Wiese et al. ................ 375/346 |
| 6,546,056 B1* | 4/2003 | Rosenlof ..................... 375/260 |
| 6,549,512 B1* | 4/2003 | Wu et al. .................... 370/210 |
| 6,597,745 B1* | 7/2003 | Dowling ..................... 375/296 |
| 6,603,811 B1* | 8/2003 | Dobson et al. ............. 375/232 |
| 6,608,864 B1* | 8/2003 | Strait .......................... 375/233 |
| 6,690,666 B1* | 2/2004 | Norrell et al. .............. 370/386 |
| 6,785,349 B1* | 8/2004 | Rosenlof et al. ........... 375/343 |
| 2002/0070796 A1* | 6/2002 | Gay-Bellile et al. ........ 329/304 |
| 2002/0086707 A1* | 7/2002 | Struhsaker et al. .......... 455/561 |
| 2002/0168002 A1* | 11/2002 | Birru ........................... 375/233 |
| 2003/0031244 A1* | 2/2003 | Vaidyanathan .............. 375/233 |
| 2003/0190000 A1* | 10/2003 | Matsumoto .................. 375/350 |
| 2004/0096022 A1* | 5/2004 | Zhang ......................... 375/353 |

FOREIGN PATENT DOCUMENTS

EP 1043875 A2 * 10/2000

OTHER PUBLICATIONS

Interference suppression in DMT receivers using windowing, Kapoor, S. and Nedic, S.;□□Communications, 2000. ICC 2000. 2000 IEEE International Conference on vol. 2, Jun. 18-22, 2000 pp. 778-782 vol. 2□□.*

US 000160, "A Frequency Domain Equalizer for Terrestrial Digital TV Reception" Filed Concurrently herewith.

US 010190, "Generation of Decision Feedback Equalizer Data- using Trellis Decoder Traceback Output in an ATSC HDTV Receiver", Filed Concurrently herewith.

US 010187, "A Two Stage Equalizer for Trellis Coded Systems", Filed Apr. 10, 2001.

* cited by examiner

Primary Examiner—Stephen Chin
Assistant Examiner—Erin M. File

(57) ABSTRACT

A channel decoder employs a hybrid frequency-time domain equalizer for effectively combining a frequency domain equalizer with a time domain equalizer to achieve superior static and dynamic multi-path performance compared to conventional decision feedback equalizers. A frequency domain equalizer structure is included within the forward path of a time domain, decision feedback equalizer, with both the frequency domain and time domain portions employing a common error vector. Updates to the taps (frequency bins) may be adapted individually, or fully within the frequency domain without altering the feedback filter. Improved performance, including performance for noisy channels with deep notches, is achieved, and the frequency domain equalizer portion is relieved from equalizing minimum phase zeros of the channel.

20 Claims, 3 Drawing Sheets

HYBRID FREQUENCY-TIME DOMAIN EQUALIZER

RELATED APPLICATION

The present application is related to the subject matter of commonly assigned, co-pending application Ser. No. 09/840,203, entitled "A FREQUENCY-DOMAIN EQUALIZER FOR TERRESTRIAL DIGITAL TV RECEPTION." The contents of the above-identified application is incorporated herein by reference.

TECHNICAL FIELD OF THE INVENTION

The present invention is directed, in general, to channel equalization in decoding wireless signals and, more specifically, to hybrid frequency-time domain equalization for improved performance.

BACKGROUND OF THE INVENTION

The related application identified above discloses a frequency domain equalizer for vestigial sideband (VSB) decoders implemented within a single integrated circuit multi-standard demodulator also including an orthogonal frequency division multiplexing (OFDM) decoder. Rather than a frequency domain implementation of a time domain finite impulse response (FIR) filter, which is computationally intensive, the frequency domain equalizer disclosed employs a least square cost function which is memory intensive in adaptive inverse channel estimation. As a result, the hardware required for adaptive inverse channel estimation may be mapped to the hardware employed for (memory intensive) OFDM decoding.

From simulation results, the performance of the frequency domain equalizer disclosed in the related application is expected to be at least as good as currently implemented VSB equalizers, and in some cases even better, particularly for noisy non-minimum phase channels (where decision feedback equalizers suffer from convergence to a local minims if the length of the forward taps is short), long delay dispersions and co-channel interference. In addition, performance of the frequency domain equalizer disclosed is hardly affected by the location of a spike initialization (the center tap).

Even though performance of the frequency domain equalizer is at least as good as if not better than the performance of a typical standard time domain decision feedback equalizer (DFE) under the circumstances described, use of the frequency domain equalizer alone may not be adequate to solve the equalization problem of vestigial sideband (VSB) modulation with eight discrete amplitude levels (8-VSB). The frequency domain equalizer behavior approximates a finite impulse response (FIR) Wiener solution, which could be inadequate for noise channels that have deep notches.

On the other hand, a decision feedback equalizer (discussed generally in J. Proakis, *Digital Communications, Third Edition*) would theoretically exhibit better performance in such a situation if the decisions fed back to the equalizer are reliable and the length of the filters is sufficiently long. With reliable decisions, such as with a high signal-to-noise ratio (SNR) signal or using trellis decisions, the decision feedback equalizer would perform better than the frequency domain equalizer disclosed in the related application for some channels.

There is, therefore, a need in the art for a frequency domain equalizer which retains the advantages of adaptive inverse channel estimation while also obtaining the benefits of the feedback portion of a decision feedback equalizer with reliable decisions and a sufficiently long filter.

SUMMARY OF THE INVENTION

To address the above-discussed deficiencies of the prior art, it is a primary object of the present invention to provide, for use in a channel decoder, a hybrid frequency-time domain equalizer for effectively combining a frequency domain equalizer with a time domain equalizer to achieve superior static and dynamic multi-path performance compared to conventional decision feedback equalizers. A frequency domain equalizer structure is included within the forward path of a time domain, decision feedback equalizer, with both the frequency domain and time domain portions employing a common error vector. Updates to the taps (frequency bins) may be adapted individually, or fully within the frequency domain without altering the feedback filter. Improved performance, including performance for noisy channels with deep notches, is achieved, and the frequency domain equalizer portion is relieved from equalizing minimum phase zeros of the channel.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
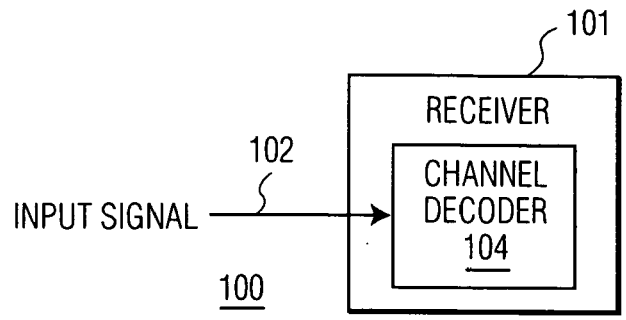
FIG. 1 depicts a system in which a hybrid frequency-time domain equalizer is implemented according to one embodiment of the present invention.

FIG. 1 depicts a system in which a hybrid frequency-time domain equalizer is implemented according to one embodiment of the present invention. System 100 includes a receiver 101, which in the exemplary embodiment is a digital television (DTV) receiver including a channel decoder 104 described in further detail below and capable of demodulating digital television broadcast signals 102 according to the vestigial sideband (VSB) standard, where the digital television signals are received at an input 103.

Those skilled in the art will perceive that FIG. 1 does not explicitly depict all components within the digital television receiver of the exemplary embodiment. Only so much of the commonly known construction and operation of a digital television receiver and the components therein as are unique to the present invention and/or required for an understanding of the present invention are shown and described herein.

Figure 2:
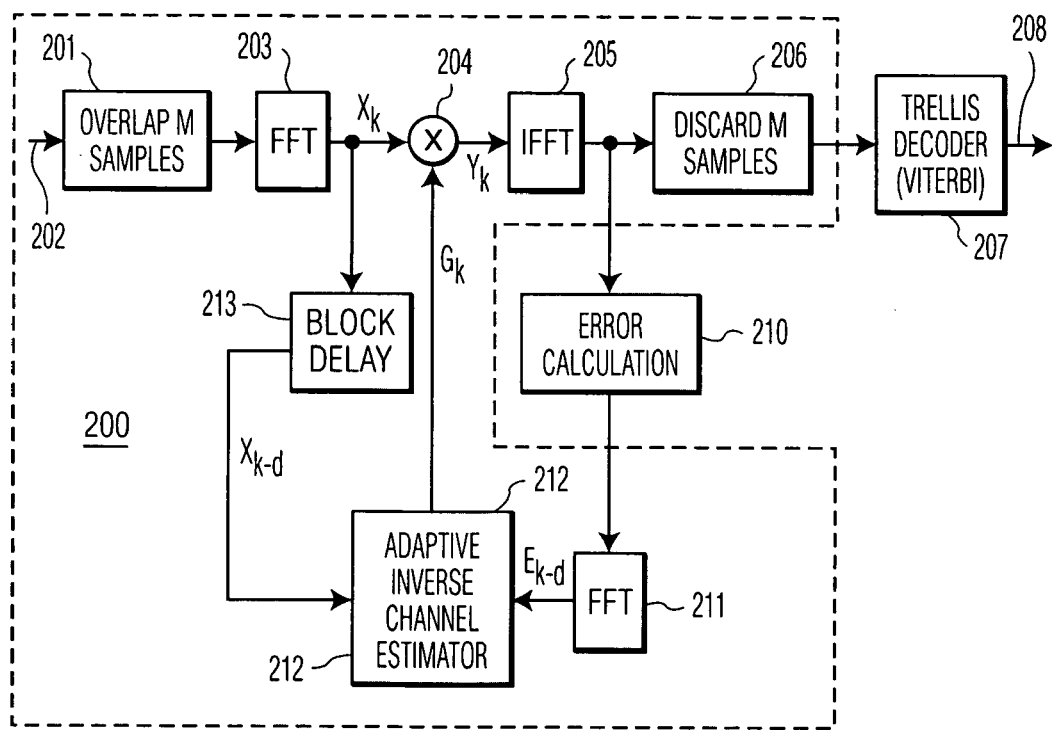
FIG. 2 is a simplified diagram showing, in greater detail, a frequency domain equalizer employing an adaptive inverse channel estimator for use in a hybrid frequency-time domain equalizer according to one embodiment of the present invention.

FIG. 2 is a simplified diagram showing, in greater detail, a frequency domain equalizer employing an adaptive inverse channel estimator for use in a hybrid frequency-time domain equalizer according to one embodiment of the present invention. Frequency domain equalizer 200 includes an overlap unit 201 receiving the input signals 202 to be decoded and overlapping M samples to form N samples, where N is the FFT size, which are converted to the frequency domain by FFT unit 203. The output of the FFT unit 203 is modeled as an N×N diagonal matrix $X_k$, where the diagonal elements $\{X_{(n,k)}\}$ of the array $X_k$ are the output of FFT unit 203. The subscript (n,k) refers to the nth frequency bin at the kth FFT block, where n=1, ..., N.

The output of FFT unit 203 is multiplied by signal multiplier 204 with $G_k$, an N size row vector containing the frequency bins of the inverse channel estimate $\{G_{(n,k)}\}$, to produce $Y_k$, an N size row vector containing the equalized frequency domain output $\{Y_{(n,k)}\}$. The equalized frequency domain output may therefore be described as:

$$Y_k = G_k X_k$$

The frequency domain inverse channel estimate $G_k$ is obtained in the present invention by finding the value of $G_k$ which minimizes a modified version of the time domain recursive least square (RLS) cost function applied to the frequency domain data:

$$J_k = \sum_{l=0}^{k} \lambda^{k-l} \|E_l\|^2$$

where $E_l$ is the frequency domain error vector defined by $E_l = S_l - G_k X_l$, $S_k$ is an N size row vector containing the frequency domain representation of the transmitted VSB source signal (which is assumed to be known), $\|E\|^2 = EE^H$ (where the superscript $^H$ denotes transposed complex conjugate), and $\lambda$ is a positive constant known as the forgetting factor and having a value constrained by $0<\lambda<1$.

The minimum of the cost function $J_\lambda$ is identified by finding the value $G_k$ which satisfies the following partial derivative:

$$\frac{\partial J_k}{\partial G_k} = 0.$$

In order to simplify further analysis, a correlation matrix $R_k$ of the input signal $X_k$ is defined:

$$R_k = \sum_{l=0}^{k} \lambda^{k-l} \|X_l\|^2,$$

together with a cross-correlation vector $P_k$ between the input signal $X_k$ and the desired signal $S_k$:

$$P_k = \sum_{l=0}^{k} \lambda^{k-l} S_l X_l^H.$$

Utilizing these two correlation values within the cost function $J_k$, and after further simplification, the cost function $J_k$ may be expressed as:

$$J_k = \sum_{l=0}^{k} \lambda^{k-l} \|S_l\|^2 + G_k R_k G_k^H - G_k P_k^H - P_k G_k^H. \quad (1)$$

Since $R_k$ is a diagonal matrix and $P_k$ is a vector, the partial differentiation of equation (1) with respect to the elements of $G_k$ yields:

$$\frac{\partial J_k}{\partial G_k^H} = G_k R_k - P_k.$$

The optimum value of $G_k$ is then obtained from the solution of the set of equations $G_k R_k - P_k = 0$, the solution to which yields $$G_k = P_k R_k^{-1}. \quad (2)$$

Because $$P_k = \lambda P_{k-1} + S_k X_k^H,$$

and assuming that $\overline{E}_k = S_k - G_{k-1}X_k$ is a prior estimate of the error $E_k$, the cross-correlation vector $$P_k = \lambda P_{k-1} + \overline{E}_k X_k^H + G_{k-1}\|X_k\|^2$$

may be written as $$P_k = \lambda(G_{k-1}R_{k-1}) + \overline{E}_k X_k^H + G_{k-1}\|X_k\|^2$$

because $P_{k-1} = G_{k-1}R_{k-1}$. Substitution of this expression for the cross-correlation vector $P_k$ in equation (2), with further simplification, yields $$G_k = G_{k-1}(\lambda R_{k-1} + \|X_k\|^2)R_k^{-1} + \overline{E}_k X_k^H R_k^{-1}. \qquad (3)$$

However, where $R_{k-1}$ is initialized with a suitable constant, the correlation matrix $R_k$ may also be described by the following recursive equation:

$$R_k = \lambda R_{k-1} + \|X_k\|^2. \qquad (4)$$

Use of this substitution in equation (3), after further simplification, results in $$G_k = G_{k-1} + \overline{E}_k X_k^H R_k^{-1}. \qquad (5)$$

The equalized frequency domain output $Y_k$ from signal multiplier 204 is input into IFFT unit 205 for conversion to the time domain. The output of IFFT unit 205 is passed to a discard unit 206, which discards M samples and passes the remaining samples to a trellis decoder (Viterbi) unit 207 which generates the decoded output 208 as well as tentative decisions regarding the error. Error is calculated within error unit 210 in the time domain utilizing the conversion of the equalized frequency domain output $Y_k$ from FFT unit 205, then converted back into the frequency domain by FFT unit 211. The converted error is then employed by adaptive RLS inverse channel estimator 212 to compute the inverse channel estimate $G_k$.

Depending on the convergence status, error is calculated by error unit 210 utilizing the training sequence, blind algorithms, and/or the tentative decisions from the trellis decoder 207. The above analysis of adaptive inverse channel estimation assumed that the transmitted and error sequences are a priori known, while in practice only the portion of the transmitted sequence is known and the error sequence is not often known. Accordingly, stochastic techniques must be employed to obtain equivalent error. Utilization of other techniques, such as the constant modulus algorithm (CMA) and decision directed techniques, to calculate a substitute error may be accommodated by modifying equation (5) to $$G_k = G_{k-1} + \mu E_k X_k^* R_k^{-1} \qquad (6)$$

where $\mu$ is a positive constant controlling the adaptation speed and excess mean-square error (MSE).

In the case of VSB, the time distance between successive training sequences (training signals) is so far apart that other techniques must be employed to calculate the error in between training sequences. Depending on the severity of the inter symbol interference (ISI), blind algorithms and decision directed algorithms may be employed to calculate an equivalent error which may be substituted for the actual error.

A block delay unit 213 is also inserted within frequency domain equalizer 200 to reflect the implementation related estimator loop delay (i.e., delay relating to IFFT unit 205, error unit 210 and FFT unit 211). The inverse channel estimate $G_k$ is therefore updated utilizing delayed versions of frequency domain input $X_k$ and error $E_k$ (and correlation matrix $R_k$ employed in calculating error $E_k$.

Figure 3:
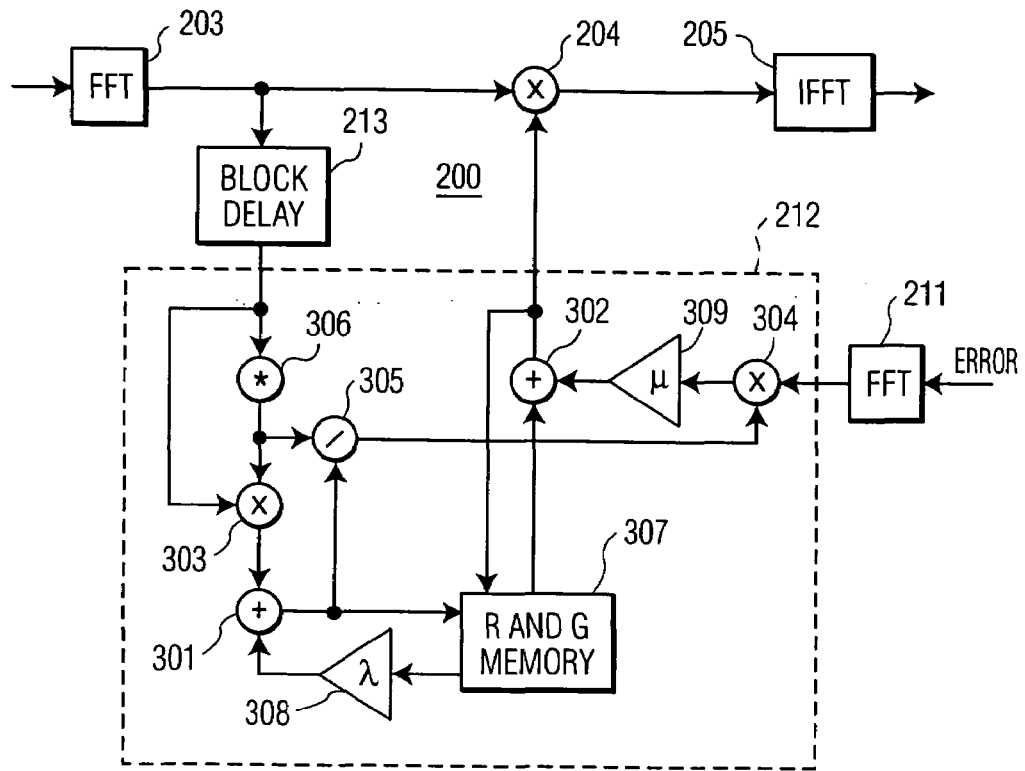
FIG. 3 depicts in greater detail an adaptive inverse channel estimator for a frequency domain equalizer according to one embodiment of the present invention.

FIG. 3 depicts in greater detail an adaptive inverse channel estimator for a frequency domain equalizer according to one embodiment of the present invention. Adaptive inverse channel estimator 212 depicted in FIG. 2 is implemented as shown. Since correlation matrix $R_k$ is a diagonal matrix, the inverse operation involves only inversion of the diagonal elements. Denoting the nth frequency bin within the kth FFT frame as, for example, $G_{n,k}$, where n=1, ... N, the frequency bin update for equations (4) and (6) reduce to $$R_{n,k} = \lambda R_{n,k-1} + \|X_{n,k}\|^2 \qquad (7)$$

and $$G_{n,k} = G_{n,k-1} + \mu E_{n,k} X_{nk}^* R_{n,k}^{-1}, \qquad (8)$$

where $R_{n,k}$, $X_{n,k}$, $G_{n,k}$, and $E_{n,k}$ are the diagonal elements of correlation matrix $R_k$, input signal $X_k$, inverse channel estimate $G_k$, and error $E_k$, respectively.

As illustrated in FIG. 3, frequency bin update equations (7) and (8) require a few adders 301 and 302, two complex multipliers 303 and 304, and one complex divider 305. The delayed output $X_{k-d}$, from block delay 213 is passed to signal complex conjugator 306 as well as multiplier 303. Multiplier 303 also receives the output of complex conjugator 306, as does divider 305. The output of multiplier 303, $\|X_{n,k}\|^2$, is added by adder 301 to the previous correlation matrix diagonal element $R_{n,k-1}$ from memory 307 after filtering by $\lambda$ filter 308 to compute current correlation matrix diagonal element $R_{n,k}$.

Correlation matrix diagonal element $R_{n,k}$ is stored in memory 307 and passed to divider 305 to compute $$X_{nk}^* R_{n,k}^{-1},$$

which is then passed to multiplier 304 to be multiplied with error diagonal element $E_{n,k}$, with the result being filtered by $\mu$ filter 309 before being passed to adder 302. Adder 302 also receives the previous inverse channel estimate diagonal element $G_{n,k-1}$ from memory 307, and the output of adder 302 is the current inverse channel estimate diagonal element $G_{n,k}$, which is passed to multiplier 204 and stored in memory 307.

The values of λ and μ, which control the excess MSE and tracking/convergence behavior of the adaptation algorithm (although the correlation matrix $R_k$ is also very useful for convergence and tracking), may be chosen in such a way that multiplication with these values may be implemented with shift and add operations only.

The approximate time domain behavior of the frequency domain equalizer depicted in FIGS. 2 and 3 includes a filtering part approximately equal to an FFT implementation of an FIR filter using cyclic convolution and an updating part equivalent to a block time domain RLS update converging approximately to a Wiener FIR filter solution:

$$G = \frac{H^*}{\|H\|^2 + \sigma},$$

where H is the effective frequency response of the channel and σ is the additive white Gaussian noise (AWGN) noise.

Figure 4:
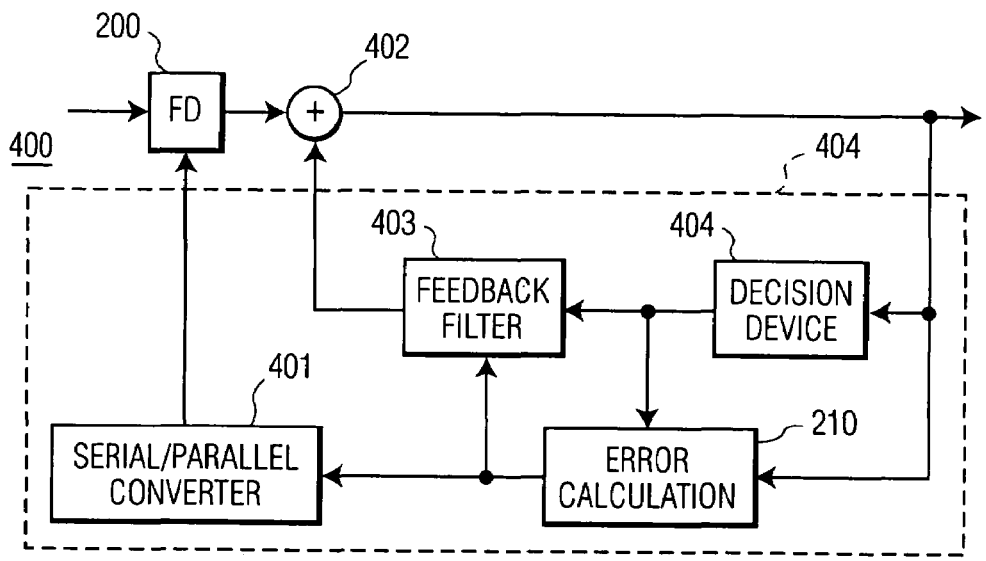
FIG. 4 depicts a hybrid frequency-time domain equalizer according to one embodiment of the present invention.

FIG. 4 depicts a hybrid frequency-time domain equalizer according to one embodiment of the present invention. Hybrid frequency-time domain equalizer 400 is essentially a time domain decision feedback equalizer including a frequency domain equalizer 200 within the forward path, with the time domain equalizer adapted to employ the same error vector (error calculation unit 210) as the frequency domain equalizer. The error vector may be computed utilizing a blind decision-directed algorithm or a constant modulus algorithm, and is passed through serial-to-parallel converter 401 before being forwarded to the frequency domain equalizer portion 200 of the hybrid equalizer 400. While the frequency domain equalizer portion 200 of the hybrid equalizer 400 need not necessarily employ adaptive inverse channel estimation as described above, performance of the hybrid equalizer 400 may not be acceptable if other channel estimation techniques are employed.

Hybrid frequency-time domain equalizer 400 includes a signal adder 402 receiving the time domain output of the frequency domain equalizer 200, forming the forward path of the hybrid equalizer 400 from frequency domain equalizer portion 200 through signal adder 402 to trellis decoder 207 (not shown in FIG. 4).

While the update of the frequency domain portion 200 of the hybrid equalizer 400 is performed in the frequency domain, updating of the feedback time domain filter 403 is done with a conventional, sample-by-sample time domain update. Accordingly, hybrid frequency-time domain equalizer 400 also includes a decision feedback equalizer decision network 405 within the feedback loop (path) of frequency domain equalizer, including decision device 404, feedback filter 403, error calculation unit 210, serial-to-parallel converter 401, and the connections to frequency domain equalizer portion 200 and signal adder 402 as well as to the output of signal adder 402.

The decision device 404 receives the output of signal adder 402, which is also passed to trellis decoder 207, and may optionally form a part of trellis decoder 207 since trellis decisions are preferably employed by the decision feedback equalizer portion of hybrid equalizer 400. Such use of trellis decision in computing the error is described more fully in commonly assigned, co-pending applications Ser. No. 09/840,218 entitled "GENERATION OF DECISION FEEDBACK EQUALIZER DATA USING TRELLIS DECODER TRACEBACK OUTPUT IN AN ATSC HDTV RECEIVER" and Ser. No. 09/829,788 entitled "A TWO STAGE EQUALIZER FOR TRELLIS CODED SYSTEMS," which are incorporated herein by reference.

The time domain error vector from error calculation unit 210 is passed to feedback filter 403, and the decisions from decision device 404 are also passed to error calculation unit 210 in addition to feedback filter 403.

The time domain equivalent of the hybrid equalizer 400 is a decision feedback equalizer with a very long forward filter, such as a 2000 tap forward filter. Such a large forward filter facilitates convergence in the time domain to a global minima, although convergence/tracking speed and integrated circuit area costs would prohibit effective use of a such a large equalizer In the time domain. The hybrid equalizer 400 is thus preferable since initial convergence speed and tracking is enhanced by adapting the taps (the frequency bins) individually. The hybrid equalizer 400 also alleviates the frequency domain equalizer portion 200 from equalizing the minimum-phase zeros of the channel.

Hybrid equalizer 400 utilizes a hybrid frequency-time domain tap update in which the taps of the frequency domain portion and that of the time domain portion are adapted in a different manner. An alternative is a fully frequency-domain tap update, while the filtering part of the equalizer remains unchanged (i.e., the feedback filter still operates in the time domain). Tap (frequency bin) update equations similar to those described above for the frequency domain equalizer portion 200 may be employed for both the forward and feedback paths, although and additional pair of FFT/IFFT filters would be required.

Figure 5:
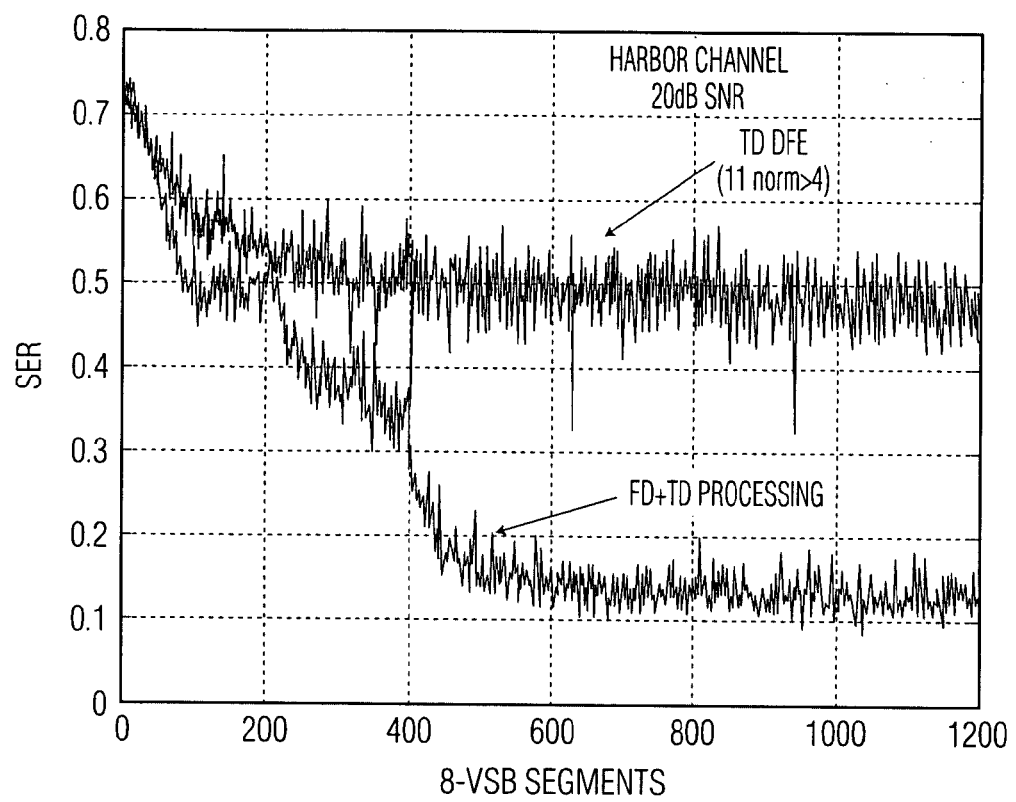
FIG. 5 depicts simulation results for a hybrid frequency-time domain equalizer in accordance with one embodiment of the present invention.

FIG. 5 depicts simulation results for a hybrid frequency-time domain equalizer in accordance with one embodiment of the present invention. The plot displays typical symbol error rate (SER) performance of a conventional decision feedback equalizer having 128 forward taps and 256 feedback taps versus a hybrid frequency-time domain equalizer having a 2K FFT in the frequency domain equalizer portion, where decisions from the trellis decoder were employed in the feedback path of the equalizers. The hybrid equalizers performance was significantly better.

The hybrid equalizer of the present invention has superior static and multi-path performance compared to conventional decision feedback equalizers, including for noisy channels with deep notches. A frequency domain equalizer is seamlessly integrated with a time domain decision feedback equalizer decision network 405 within the feedback path. Decisions from a trellis decoder may be employed, and reduced likelihood of convergence to a local rather than global minima improves the robustness of the performance. Decision-directed algorithms for tap updates are also possible.

It is important to note that while the present invention has been described in the context of a fully functional hard-ware based system and/or network, those skilled in the art will appreciate that the mechanism of the present invention is capable of being distributed in the form of a machine usable medium containing instructions in a variety of forms, and that the present invention applied equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions and alterations herein may be made without departing from the spirit and scope of the invention in its broadest form.

What is claimed is:

1. For use in a channel decoder, a hybrid frequency-time domain equalizer for improved static and multi-path performance over a decision feedback equalizer comprising:
   a frequency domain equalizer having forward and feedback paths; and
   a decision feedback equalizer decision network within said feedback path of said frequency domain equalizer comprising a time domain feedback filter, said frequency domain equalizer and said decision feedback equalizer decision network both employing a single error vector to update error correction therein.

2. The hybrid frequency-time domain equalizer as set forth in claim 1 wherein said decision feedback equalizer decision network further comprises a decision device within said feedback path for said frequency domain equalizer.

3. The hybrid frequency-time domain equalizer as set forth in claim 2 wherein said decision device employs trellis decisions to minimize decoding error.

4. The hybrid frequency-time domain equalizer as set forth in claim 1 wherein taps updates for said decision feedback equalizer decision network are separate from tap updates for said frequency domain equalizer.

5. A receiver comprising:
   an input receiving single carrier digital signals; and
   a channel decoder employing a hybrid frequency-time domain equalizer for improved static and multi-path performance over a decision feedback equalizer, said hybrid frequency-time domain equalizer comprising:
      a frequency domain equalizer having forward and feedback paths; and
      a decision feedback equalizer decision network within said feedback path of said frequency domain equalizer comprising a time domain feedback filter, said frequency domain equalizer and said decision feedback equalizer decision network both employing a single error vector to update error correction therein.

6. The receiver as set forth in claim 5 wherein said decision feedback equalizer decision network further comprises a decision device within said feedback path for said frequency domain equalizer.

7. The receiver as set forth in claim 6 wherein said decision device employs trellis decisions to minimize decoding error.

8. The receiver as set forth in claim 5 wherein taps updates for said decision feedback equalizer decision network are separate from tap updates for said frequency domain equalizer.

9. For use in a channel decoder, a method of hybrid frequency-time domain equalization for improved static and multi-path performance over a decision feedback equalizer comprising:
   receiving a single carrier input signal at a frequency domain equalizer having forward and feedback paths; and
   employing a decision feedback equalizer decision network within the feedback path of the frequency domain equalizer comprising a time domain feedback filter, the frequency domain equalizer and the decision feedback equalizer decision network both employing a single error vector to update error correction therein.

10. The method as set forth in claim 9 wherein the step of employing a decision feedback equalizer decision network within the feedback path of the frequency domain equalizer further comprises:
    employing a decision device within the feedback path for the frequency domain equalizer.

11. The method as set forth in claim 10 wherein the step of employing a decision device within the feedback path for the frequency domain equalizer further comprises:
    employing trellis decisions within the feedback path for the frequency domain equalizer to minimize decoding error.

12. The method as set forth in claim 9 further comprising:
    updating taps for the decision feedback equalizer decision network separately from tap updates for the frequency domain equalizer.

13. For use in a channel decoder, a hybrid frequency-time domain equalizer for improved static and multi-path performance over a decision feedback equalizer comprising:
    a decision feedback equalizer having forward and feedback paths; and
    a frequency domain equalizer within said forward path of said decision feedback equalizer comprising a time domain feedback filter, said frequency domain equalizer and said decision feedback equalizer decision network both employing a single error vector to update error correction therein.

14. The hybrid frequency-time domain equalizer as set forth in claim 13 wherein said decision feedback equalizer further comprises a decision device within said feedback path, said feedback path forming a portion of a feedback path for said frequency domain equalizer.

15. The hybrid frequency-time domain equalizer as set forth in claim 14 wherein said decision device employs trellis decisions to minimize decoding error.

16. The hybrid frequency-time domain equalizer as set forth in claim 13 wherein taps updates for said decision feedback equalizer are separate from tap updates for said frequency domain equalizer.

17. For use in a channel decoder, a hybrid frequency-time domain equalizer for improved static and multi-path performance over a decision feedback equalizer comprising:
    a frequency domain equalizer having forward and feedback paths; and
    a decision feedback equalizer decision network within said feedback path of said frequency domain equalizer, said frequency domain equalizer and said decision feedback equalizer decision network both employing a single error vector to update error correction therein and taps updates for said decision feedback equalizer are separate from tap updates for said frequency domain equalizer.

18. A receiver comprising:
    an input receiving single carrier digital signals; and
    a channel decoder employing a hybrid frequency-time domain equalizer for improved static and multi-path performance over a decision feedback equalizer, said hybrid frequency-time domain equalizer comprising:
        a frequency domain equalizer having forward and feedback paths; and a decision feedback equalizer decision network within said feedback path of said frequency domain equalizer, said frequency domain equalizer and said decision feedback equalizer decision network both employing a single error vector to update error correction therein and taps updates for said decision feedback equalizer are separate from tap updates for said frequency domain equalizer.

19. For use in a channel decoder, a method of hybrid frequency-time domain equalization for improved static and multi-path performance over a decision feedback equalizer comprising:

receiving a single carrier input signal at a frequency domain equalizer having forward and feedback paths; and employing a decision feedback equalizer decision network within the feedback path of the frequency domain equalizer, the frequency domain equalizer and the decision feedback equalizer decision network both employing a single error vector to update error correction therein and taps updates for said decision feedback equalizer are separate from tap updates for said frequency domain equalizer.

20. For use in a channel decoder, a hybrid frequency-time domain equalizer for improved static and multi-path performance over a decision feedback equalizer comprising:

a decision feedback equalizer having forward and feedback paths; and a frequency domain equalizer within said forward path of said decision feedback equalizer, said frequency domain equalizer and said decision feedback equalizer decision network both employing a single error vector to update error correction therein and taps updates for said decision feedback equalizer are separate from tap updates for said frequency domain equalizer.

* * * * *